(12) United States Patent
Resendes et al.

(10) Patent No.: US 7,345,128 B2
(45) Date of Patent: Mar. 18, 2008

(54) PEROXIDE CURABLE BUTYL FORMULATIONS

(75) Inventors: Rui Resendes, Sarnia (CA); Adam Gronowski, Sarnia (CA)

(73) Assignee: Lanxess Inc., Sarnia, Ontario (CA)

( * ) Notice: Subject to any disclaimer, the term of this patent is extended or adjusted under 35 U.S.C. 154(b) by 0 days.

(21) Appl. No.: 10/834,438

(22) Filed: Apr. 29, 2004

(65) Prior Publication Data

US 2005/0245692 A1      Nov. 3, 2005

(30) Foreign Application Priority Data

Apr. 28, 2004  (CA) .................................. 2465407

(51) Int. Cl.
   *C08F 210/10*  (2006.01)
   *C08F 110/10*  (2006.01)
(52) U.S. Cl. ................... 526/348.7; 526/348; 526/335; 526/336; 526/346
(58) Field of Classification Search ............... 526/348, 526/348.7, 335, 336, 346
   See application file for complete search history.

(56) References Cited

U.S. PATENT DOCUMENTS

| 3,042,662 | A | | 7/1962 | Cottle ....................... 260/85.3 |
| 3,862,265 | A | | 1/1975 | Steinkamp et al. ..... 260/878 R |
| 4,749,505 | A | | 6/1988 | Chung et al. ........... 252/51.5 A |
| 4,779,657 | A | * | 10/1988 | Cheung et al. ............. 152/510 |
| 5,578,682 | A | | 11/1996 | White ......................... 525/282 |
| 5,824,717 | A | * | 10/1998 | Merrill et al. ................ 522/81 |
| 5,994,465 | A | | 11/1999 | Sudo et al. ................. 525/105 |
| 2003/0220454 | A1 | | 11/2003 | Kaszas ..................... 525/331.9 |
| 2004/0249085 | A1 | | 12/2004 | Waddell et al. .......... 525/333.3 |
| 2005/0119382 | A1 | | 6/2005 | Resendes et al. ........... 524/210 |

FOREIGN PATENT DOCUMENTS

| CA | 2 316 741 |   | 2/2002 |
| CA | 2 386 628 | * | 11/2003 |
| JP | 6-107738 |   | 4/1994 |

* cited by examiner

*Primary Examiner*—Ling-Sui Choi
(74) *Attorney, Agent, or Firm*—Jennifer R. Seng

(57) ABSTRACT

The present invention relates to a peroxide curable rubber compound comprising at least one elastomeric polymer comprising repeating units derived from at least one $C_4$ to $C_7$ isomonoolefin monomer, at least one $C_4$ to $C_{14}$ multiolefin monomer and at least one m- or p-alkylstyrene monomer.

19 Claims, 1 Drawing Sheet

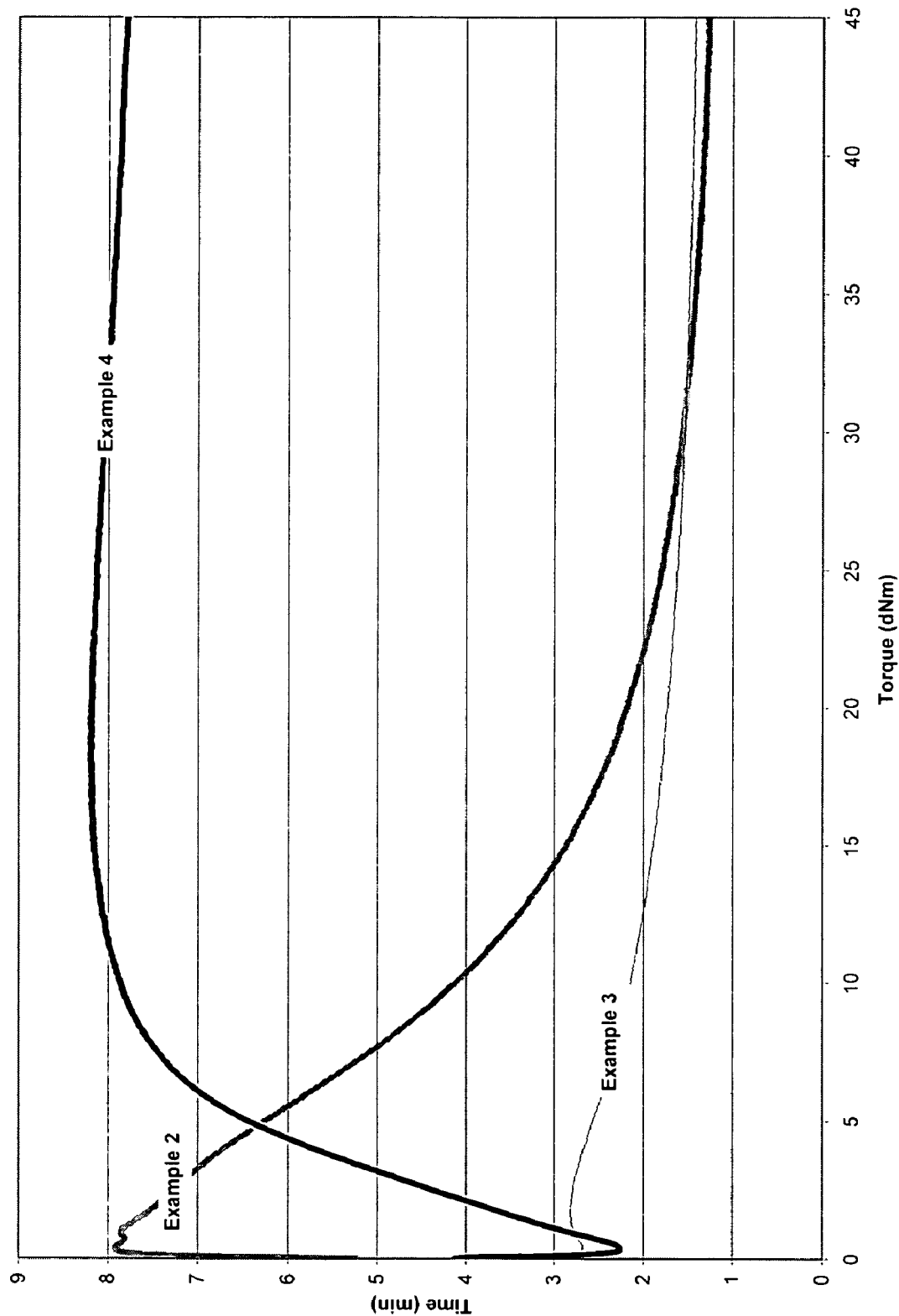

PEROXIDE CURABLE BUTYL FORMULATIONS

FIELD OF THE INVENTION

The present invention relates to a peroxide curable rubber compound comprising at least one elastomeric polymer comprising repeating units derived from at least one $C_4$ to $C_7$ isomonoolefin monomer, at least one $C_4$ to $C_{14}$ multiolefin monomer and at least one m- or p-alkylstyrene monomer.

BACKGROUND OF THE INVENTION

Butyl rubber is known for its excellent insulating and gas barrier properties. Generally, commercial butyl polymer is prepared in a low temperature cationic polymerization process using Lewis acid-type catalysts, of which a typical example is aluminum trichloride. The process used most extensively employs methyl chloride as the diluent for the reaction mixture and the polymerization is conducted at temperatures on the order of less than −90° C., resulting in production of a polymer in a slurry of the diluent. Alternatively, it is possible to produce the polymer in a diluent which acts as a solvent for the polymer (e.g., hydrocarbons such as pentanes, hexanes, heptanes and the like). The product polymer may be recovered using conventional techniques in the rubber manufacturing industry.

In many of its applications, butyl rubber is used in the form of cured compounds. Vulcanizing systems usually utilized for butyl rubber include sulfur, quinoids, resins, sulfur donors and low-sulfur high performance vulcanization accelerators.

Peroxide curable butyl rubber compounds offer several advantages over conventional, sulfur-curing systems. Typically, these compounds display extremely fast cure rates and the resulting cured articles tend to possess excellent heat resistance. In addition, peroxide-curable formulations are considered to be "clean" in that they do not contain any extractable inorganic impurities (e.g. sulfur). The clean rubber articles can therefore be used, for example, in condenser caps, biomedical devices, pharmaceutical devices (stoppers in medicine-containing vials, plungers in syringes) and possibly in seals for fuel cells.

It is well accepted that polyisobutylene and butyl rubber decomposes under the action of organic peroxides. Furthermore, U.S. Pat. No. 3,862,265 and U.S. Pat. No. 4,749,505 teach us that copolymers of a $C_4$ to $C_7$ isomonoolefin with LIP to 10 wt. % isoprene or up to 20 wt. % para-alkylstyrene undergo a molecular weight decrease when subjected to high shear mixing. This effect is enhanced in the presence of free radical initiators.

One approach to obtaining a peroxide-curable butyl-based formulation lies in the use of conventional butyl rubber in conjunction with a vinyl aromatic compound like divinylbenzne (DVB) and an organic peroxide (see JP-A-107738/1994). In place of DVB, an electron-withdrawing group-containing a polyfunctional monomer (ethylene dimethacrylate, trimethylolpropane triacrylate, N,N'-m-phenylene dimaleimide) can also be used (see JP-A-172547/1994).

The disadvantage of these methods is that the resulting compound is contaminated with the low molecular weight reagents added to induce crosslinking, which did not fully react with the rubber in the solid state. Also, the action of peroxide on the regular butyl rubber may lead to formation of some low molecular weight compounds from the degraded rubber. The final articles based on such compounds may display an undesirable characteristic of leaching out the said low molecular species and accelerated aging.

A commercially available terpolymer based on IB, IP, and DVB, Bayer XL-10000, is curable with peroxides alone. While said commercial pre-crosslinked polymers exhibit excellent properties in many applications, they have a gel content of at least 50 wt. % which sometimes makes the even dispersion of fillers and curatives normally used during vulcanization difficult. This increases the likelihood of under- and over-cured areas within the rubbery article, rendering its physical properties inferior and unpredictable. Also, the Mooney viscosity of this rubber is high, usually 60-70 units (1'+8'@125° C.) which may cause significant processing difficulties, during mixing and sheeting stages.

Co-Pending Canadian Application CA-2,316,741 discloses terpolymers of isobutylene, isoprene and DVB prepared in the presence of a chain-transfer agent, such as diisobutylene, which are substantially gel-free and have an improved processability.

Co-Pending Canadian Application CA-2,386,628 discloses peroxide curing and high purity applications for said terpolymers of isobutylene, isoprene and DVB prepared in the presence of a chain-transfer agent, such as diisobutylene. However, the presence of free DVB can present serious safety concerns. For these reasons, it would be desirable to have an isobutylene based polymer which is peroxide curable, completely soluble (i.e. gel free) and does not contain any DVB in its composition.

White et al. (U.S. Pat. No. 5,578,682) teach a process for obtaining a polymer composition comprising polymeric material selected from the group consisting of polypropylene, copolymers of propylene with up to 10 mole % ethylene, polyisobutylene, copolymers of a $C_4$ to $C_7$ isomonoolefin with up to 10 wt % isoprene, copolymers of a $C_4$ to $C_7$ isomonoolefin with up to 20 wt % of para-alkylstyrene and mixtures thereof, said polymeric material having a number average molecular weight in the range of from about 5,000 up to 5,000,000, and characterized as having a bimodal molecular weight distribution containing a lower molecular weight species and a higher molecular weight species, said higher molecular weight species comprising at least about 1.0 weight percent of said polymeric material. The polymer was mixed with a polyunsaturated crosslinking agent (and, optionally, a free radical initiator) and subjected to high shearing mixing conditions in the presence of an organic peroxide. This patent is silent about an isoolefin-multiolefin-MAS/PAS (MAS=meta-alkylstyrene, PAS=para-alkylstyrene) terpolymer and any filled compounds of modified polymers or the cure state of such compounds.

The present invention describes the preparation of butyl-based, peroxide-curable compounds which employ the use of an isoolefin-multiolefin-MAS/PAS terpolymer in conjunction with a peroxide initiator. The present invention clearly demonstrates that there is an advantage associated with using a material which contains both a multiolefin and MAS and/or PAS in the polymer backbone.

SUMMARY OF THE INVENTION

The present invention provides a compound comprising
a. at least one elastomeric polymer comprising repeating units derived from at least one $C_4$ to $C_7$ isomonoolefin monomer, at least one $C_4$ to $C_{14}$ multiolefin monomer, at least one m- or p-alkylstyrene monomer and
b. a peroxide curing system.

Another aspect of the invention is a vulcanized rubber part comprising said peroxide-curable compound useful for high purity applications.

Yet another aspect of the invention is a condenser cap comprising said peroxide-curable compound interposed between said dynamic means and said static structure at said point of connection.

Yet another aspect of the invention is a medical device comprising said peroxide-curable compound.

Yet another aspect of the invention is a sealing gasket (e.g. fuel cell gasket) comprising an injection-moldable variant of said peroxide-curable compound.

BRIEF DESCRIPTION OF THE DRAWINGS

FIG. 1: MDR Cure Traces of the Compounds of Examples 2-4

DETAILED DESCRIPTION OF THE INVENTION

The present invention relates to butyl rubber polymers. The terms "butyl rubber", "butyl polymer" and "butyl rubber polymer" are used throughout this specification interchangeably. While the prior art in using butyl rubber refers to polymers prepared by reacting a monomer mixture comprising a $C_4$ to $C_7$ isomonoolefin monomer and a $C_4$ to $C_{14}$ multiolefin monomer or β-pinene, this invention specifically relates to elastomeric polymers comprising at least one $C_4$ to $C_7$ isomonoolefin monomer, at least one $C_4$ to $C_{14}$ multiolefin monomer, at least one m- or p-alkylstyrene monomer and optionally further copolymerizable monomers. The butyl polymer of this invention would be preferentially non-halogenated.

In connection with this invention, the term "substantially gel-free" is understood to denote a polymer containing less than 5 wt. % of solid matter insoluble in cyclohexane (under reflux for 60 min), preferably less than 3 wt. %, in particular less than 1 wt. %.

The present invention is not restricted to any particular $C_4$ to $C_7$ isomonoolefin monomer(s). Preferred $C_4$ to $C_7$ monoolefins are isobutylene, 2-methyl-1-butene, 3-methyl-1-butene, 2-methyl-2-butene, 4-methyl-1-pentene and mixtures thereof. The most preferred $C_4$ to $C_7$ isomonoolefin monomer is isobutylene.

Furthermore, the present invention is not restricted to any particular $C_4$ to $C_{14}$ multiolefin(s). However conjugated or non-conjugated $C_4$ to $C_{14}$ diolefins are particularly useful. Preferred $C_4$ to $C_{14}$ multiolefin monomers are isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene or mixtures thereof. The most preferred $C_4$ to $C_{14}$ multiolefin monomer is isoprene.

Even more, the present invention is not restricted to any particular p-alkylstyrene monomer(s). Preferred m- or p-alkylstyrene monomers are methylstyrene, ethylstyrene and propylstyrene. The most preferred alkylstyrene monomer is p-methylstyrene.

Preferably, the monomer mixture to be polymerized comprises in the range of from 70% to 98.99% by weight of at least one $C_4$ to $C_7$ isomonoolefin monomer, in the range of from 1.0% to 20% by weight of at least one $C_4$ to $C_{14}$ multiolefin monomer, and in the range of from 0.01% to 20% by weight of at least one m- or p-alkylstyrene monomer. More preferably, the monomer mixture comprises in the range of from 70% to 98.9% by weight of a $C_4$ to $C_7$ isomonoolefin monomer, in the range of from 1.0% to 10% by weight of a $C_4$ to $C_{14}$ multiolefin monomer, and in the range of from 0.1% to 20% by weight of at least one m- or p-alkylstyrene monomer. It will be apparent to the skilled in the art that the total of all monomers will result in 100% by weight.

The monomer mixture may contain minor amounts of one or more additional polymerizable co-monomers. For example, the monomer mixture may contain a small amount of styrene, α-methylstyrene, p-chlorostyrene, p-methoxystyrene, indene (including indene derivatives) and mixtures thereof. If present, it is preferred to use the additional monomer(s) in an amount of up to 5.0% by weight of the monomer mixture. The values of the $C_4$ to $C_7$ isomonoolefin monomer(s) and/or the $C_4$ to $C_{14}$ multiolefin monomer(s) will have to be adjusted accordingly to result again in a total of 100% by weight.

The use of even other monomers in the monomer mixture is possible, provided, of course, that they are copolymerizable with the other monomers in the monomer mixture.

The present invention is not restricted to a special process for preparing/polymerizing the monomer mixture. This type of polymerization is well known to the skilled in the art and usually comprises contacting the reaction mixture described above with a catalyst system. Preferably, the polymerization is conducted at a temperature conventional in the production of butyl polymers—e.g., in the range of from −100° C. to +50° C. The polymer may be produced by polymerization in solution or by a slurry polymerization method. Polymerization is preferably conducted in suspension (the slurry method)—see, for example, Ullmann's Encyclopedia of Industrial Chemistry (Fifth, Completely Revised Edition, Volume A23; Editors Elvers et al., 290-292).

The inventive polymer preferably has a Mooney viscosity ML (1+8 @125° C.) in the range of from 5 to 70 units, more preferably in the range of from 20 to 50 units.

As an example, in one embodiment the polymerization is conducted in the presence of an inert aliphatic hydrocarbon diluent (such as n-hexane) and a catalyst mixture comprising a major amount (in the range of from 80 to 99 mole percent) of a dialkylaluminum halide (for example diethylaluminum chloride), a minor amount (in the range of from 1 to 20 mole percent) of a monoalkylaluminum dihalide (for example isobutylaluminum dichloride), and a minor amount (in the range of from 0.01 to 10 ppm) of at least one of a member selected from the group comprising water, aluminoxane (for example methylaluminoxane) and mixtures thereof. Of course, other catalyst systems conventionally used to produce butyl polymers can be used to produce a butyl polymer which is useful herein—see, for example, "Cationic Polymerization of Olefins: A Critical Inventory" by Joseph P. Kennedy (John Wiley & Sons, Inc. © 1975, 10-12).

Polymerization may be performed both continuously and discontinuously. In the case of continuous operation, the process is preferably performed with the following three feed streams:

I) solvent/diluent+isomonoolefin(s) (preferably isobutene)
II) multiolefin(s) (preferably diene, isoprene), p-alkylstyrene(s)
III) catalyst In the case of discontinuous operation, the process may, for example, be performed as follows: The reactor, pre-cooled to the reaction temperature, is charged with solvent or diluent and the monomers. The initiator is then pumped in the form of a dilute solution in such a manner that the heat of polymerization may be dissipated without problem. The course of the reaction may be monitored by means of the evolution of heat.

The compound may further comprise at least one co-agent. If a co-agent is present in the present invention it is not restricted to any particular co-agent and any co-agent that is known to enhance cross-linking of the elastomeric polymer according to the present invention may be used, such as bis dieneophiles, such as HVA-2 (-m-phenylene bis-maleimide) or 1,3-bis(citraconimidomethl)benzene (Perkalink 900) and allylic type c-agents, such as triallyl cyanurate (TAC) and triallylisocyanurate (TAIC). Preferably, the compound according to the present invention does not comprise a co-agent.

The compound further comprises at least one peroxide curing system. The invention is not limited to a special peroxide curing system. For example, inorganic or organic peroxides are suitable. Preferred are organic peroxides such as dialkylperoxides, ketalperoxides, aralkylperoxides, peroxide ethers, peroxide esters, such as di-tert.-butylperoxide, bis-(tert.-butylperoxyisopropyl)-benzene, dicumylperoxide, 2,5-dimethyl-2,5-di(tert.-butylperoxy)-hexane, 2,5-dimethyl-2,5-di(tert.-butylperoxy)-hexene-(3), 1,1-bis-(tert.-butylperoxy)-3,3,5-trimethyl-cyclohexane, benzoylperoxide, tert.-butylcumylperoxide and tert.-butylperbenzoate. Usually the amount of peroxide in the compound is in the range of from 1 to 10 phr (=per hundred rubber), preferably from 4 to 8 phr. Subsequent curing is usually performed at a temperature in the range of from 100 to 200° C., preferably 130 to 180° C. Peroxides might be applied advantageously in a polymer-bound form. Suitable systems are commercially available, such as Polydispersion T(VC) D-40 P from Rhein Chemie Rheinau GmbH, D (=polymer-bound di-tert.-butylperoxy-isopropylbenzene).

Preferably, the compound further comprises at least one active or inactive filler. The filler may be in particular:

- highly disperseable silicas, prepared e.g. by the precipitation of silicate solutions or the flame hydrolysis of silicon halides, with specific surface areas of in the range of from 5 to 1000 m$^2$/g, and with primary particle sizes of in the range of from 10 to 400 nm; the silicas can optionally also be present as mixed oxides with other metal oxides such as those of Al, Mg, Ca, Ba, Zn, Zr and Ti;
- synthetic silicates, such as aluminum silicate and alkaline earth metal silicate like magnesium silicate or calcium silicate, with BET specific surface areas in the range of from 20 to 400 m$^2$/g and primary particle diameters in the range of from 10 to 400 nm;
- natural silicates, such as kaolin and other naturally occurring silica;
- glass fibres and glass fibre products (matting, extrudates) or glass microspheres;
- metal oxides, such as zinc oxide, calcium oxide, magnesium oxide and aluminum oxide;
- metal carbonates, such as magnesium carbonate, calcium carbonate and zinc carbonate;
- metal hydroxides, e.g. aluminum hydroxide and magnesium hydroxide;
- carbon blacks; the carbon blacks to be used here are prepared by the lamp black, furnace black or gas black process and have preferably BET (DIN 66 131) specific surface areas in the range of from 20 to 200 m$^2$/g, e.g. SAF, ISAF, HAF, FEF or GPF carbon blacks;
- rubber gels, especially those based on polybutadiene, butadiene/styrene copolymers, butadiene/acrylonitrile copolymers and polychloroprene;

or mixtures thereof.

Examples of preferred mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the tetrapolymer. For many purposes, the preferred mineral is silica, especially silica made by carbon dioxide precipitation of sodium silicate. Dried amorphous silica particles suitable for use in accordance with the invention may have a mean agglomerate particle size in the range of from 1 to 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil® S and Vulkasil® N, from Bayer AG.

It might be advantageous to use a combination of carbon black and mineral filler in the inventive compound. In this combination the ratio of mineral fillers to carbon black is usually in the range of from 0.05 to 20, preferably 0.1 to 10. For the rubber composition of the present invention it is usually advantageous to contain carbon black in an amount of in the range of from 20 to 200 parts by weight, preferably 30 to 150 parts by weight, more preferably 40 to 100 parts by weight.

Even if it is not preferred, the compound may further comprise other natural or synthetic rubbers such as BR (polybutadiene), ABR (butadiene/acrylic acid-$C_1$-$C_4$-alkylester-copolymers), CR (polychloroprene), IR (polyisoprene), SBR (styrene/butadiene-copolymers) with styrene contents in the range of 1 to 60 wt %. NBR (butadiene/acrylonitrile-copolymers with acrylonitrile contents of 5 to 60 wt %, HNBR (partially or totally hydrogenated NBR-rubber), EPDM (ethylene/propylene/diene-copolymers), FKM (fluoropolymers or fluororubbers), and mixtures of the given polymers.

The rubber composition according to the invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. Preferably the composition furthermore comprises in the range of 0.1 to 20 phr of an organic fatty acid, preferably an unsaturated fatty acid having one, two or more carbon double bonds in the molecule which more preferably includes 10% by weight or more of a conjugated diene acid having at least one conjugated carbon-carbon double bond in its molecule. Preferably those fatty acids have in the range of from 8-22 carbon atoms, more preferably 12-18. Examples include stearic acid, palmitic acid and oleic acid and their calcium-, zinc-, magnesium-, potassium- and ammonium salts.

The ingredients of the final compound are mixed together, suitably at an elevated temperature that may range from 25° C. to 200° C. Normally the mixing time does not exceed one hour and a time in the range from 2 to 30 minutes is usually adequate. The mixing is suitably carried out in an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also: Encyclopedia of Polymer Science and Engineering, Vol. 4, p. 66 et seq. (Compounding) and Vol. 17, p. 666 et seq. (Vulcanization).

Furthermore, the invention provides shaped vulcanized rubber parts for high purity applications comprising said substantially gel-free peroxide-curable compound. There are many high purity applications for which said rubber parts are suitable, such as containers for pharmaceuticals, in particular stopper and seals for glass or plastic vials, tubes, parts of syringes and bags for medical and non-medical applications, condenser caps and seals for fuel cells, parts of electronic equipment, in particular insulating parts, seals and parts of containers containing electrolytes.

The present invention will be further illustrated by the following examples.

EXAMPLES

Methyl chloride (Dow Chemical, moisture level<20 ppm) served as the diluent for polymerization. Aluminum chloride (99.99%), HVA2 (=m-phenylene-bis-maleimide), and p-methylstyrene (PMS) (97%) were purchased from Aldrich Chemical Co, the aluminum chloride and HVA2 were used as received. Prior to use, the inhibitor was removed from p-methylstyrene by using an inhibitor removing disposable column (Aldrich Chemical Co.). Isobutene and Isoprene were obtained internally and were dried prior to use, with the use of activated molecular sieves, to a moisture level of <10 ppm. The inhibitor was removed from isoprene by using an inhibitor removing disposable column (Aldrich Chemical Co.).

The mixing of a compound with carbon black (IRB #7) and peroxide (DI-CUP 40C, Struktol Canada Ltd.) was done using a miniature internal mixer (Brabender MIM) from C. W. Brabender, consisting of a drive unit (Plasticorder® Type PL-V 151) and a data interface module.

Curing was achieved with the use of an Electric Press equipped with an Allan-Bradley Programmable Controller.

The Mooney viscosity test was carried out according to ASTM standard D-1646 on a Monsanto MV 2000 Mooney Viscometer.

Cure characteristics were determined with a Moving Die Rheometer (MDR) test performed according to ASTM standard D-5289 on a Monsanto MDR 2000 (E). The upper die oscillated through a small arc of 1 degree.

Example 1

The terpolymer containing isobutylene, isoprene and para-methylstyrene (PMS) was prepared in a pilot plant with the use of a 12 L batch reactor.

To 5586 g of methyl chloride was added 1344 g of isobutylene, 52.8 g of isoprene and 305 g of PMS. The reactor contents were cooled to −95° C. at which point an $AlCl_3$—$CH_3Cl$ catalyst solution was introduced. The rubber which was recovered from the reactor was mill dried and submitted for compositional analysis ($^1H$ NMR). The resulting polymer was found to contain 82.8 mol % isobutylene, 15.7 mol % PMS, and 1.49 mol % isoprene and was gel-free.

General Mixing Recipe

Unless otherwise stated, all of the compounds (2, 3 and 4) studied were composed of:

| | |
|---|---|
| Polymer: | 100 phr |
| Carbon black (IRB #7; N330): | 50 phr |
| Peroxide (DI-CUP 40 C): | 4 phr |

Mixing was achieved with the use of a Brabender internal mixer (capacity ca. 75 g) with a starting temperature of 60° C. and a mixing speed of 50 rpm according to the following sequence:

| | |
|---|---|
| 0.0 min: | polymer added |
| 1.5 min: | carbon black added, in increments |
| 6.0 min: | peroxide added |
| 7.0 min: | co-agent (HVA-2) added |
| 8.0 min: | mix removed |

In cases where no co-agent was present, the peroxide was added 7.0 min into the mixing process. The final compound was refined on a 6"×12" mill.

Example 2

Comparative

This compound was based on a commercial polyisobutylene rubber (VISTANEX, MML-100) from Exxon according to the recipe presented above. As can be seen from FIG. 1, no cure reactivity was evident in this system. In fact, the MDR trace reveals significant degradation. This observation is consistent with what is known about the free-radical degradation of PIB.

Examples 3

Comparative

The following comparative example explores the peroxide cure of a random copolymer of a C4 to C7 isomonolefin with up to 20 wt. % of para-alkylstyrene, e.g., copolymers of isobutylene and para-methylstyrene as defined in U.S. Pat. No. 5,578,682. The material was prepared with the use of a 5 L batch reactor.

To 1980 mL of methyl chloride was added 220 mL of isobutylene and 12 mL of para-methylstyrene. The reactor contents were cooled to −95° C. at which point an $AlCl_3$—$CH_3Cl$ catalyst solution was introduced. The rubber which was recovered from the reactor was mill dried and submitted for compositional ($^1$H NMR) and molecular weight (GPC) analysis. The resulting polymer was found to contain 97 mol % isobutylene, 3 mol % of paramethylstyrene, a weight average molecular weight of 450 kg·mol$^{-1}$ and a number average molecular weight of 125 kg·mol$^{-1}$.

The compound studied was composed of:

| Polymer: | 100 phr |
|---|---|
| Carbon black (IRB #7; N330): | 50 phr |
| Peroxide (DI-CUP 40 C): | 4 phr |

Mixing was achieved with the use of a Brabender internal mixer (capacity ca. 75 g) with a starting temperature of 60° C. and a mixing speed of 50 rpm according to the following sequence:

| 0.0 min: | polymer added |
|---|---|
| 1.5 min: | carbon black added, in increments |
| 6.0 min: | peroxide added |
| 8.0 min: | mix removed |

For this compound, no cure reactivity was apparent (FIG. 1). In fact, a significant amount of reversion is evident in the rheometry profile of this material.

Example 4

Invention

This compound was based on the IB-IP-PMS terpolymer described in Example 1 according to the recipe already presented. As can be seen in FIG. 1, this compound possessed significant cure activity. Interestingly, there appears to be no indication of significant degradation (i.e. reversion).

The preceding examples serve to illustrate the utility of IB-IP-PMS terpolymers in the preparation of peroxide-curable, butyl based rubber formulations. The comparative examples clearly show that systems based on polyisobutylene homopolymers or copolymers of isobutylene and para-methylstyrene undergo degradation when peroxide curing is attempted. However, the presence of both isoprene and para-methylstyrene allow for peroxide curing. Since the starting rubber is completely soluble, of moderate Mooney (i.e. ease of processing) and does not contain any DVB (safer material to manufacture and handle), this concept represents an attractive alternative to XL-10000 based formulations.

The invention claimed is:

1. A compound comprising:
   a. at least one elastomeric polymer comprising repeating units derived from at least one $C_4$ to $C_7$ isomonoolefin monomer, at least one $C_4$ to $C_{14}$ multiolefin monomer, and at least one p-or m-alkylstyrene monomer,
   b. a peroxide curing system.

2. A compound according to claim 1, wherein the at least one $C_4$ to $C_7$ isomonoolefin monomer is selected from the group consisting of isobutylene, 2-methyl-1-butene, 3-methyl-1-butene, 2-methyl-2-butene and mixtures thereof.

3. A compound according to claim 1, wherein the at least one $C_4$ to $C_{14}$ multiolefin monomer is selected from the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadien and mixtures thereof.

4. A compound according to claim 1, wherein the at least one alkylstyrene monomer is selected from the group consisting of p- or m-methylstyrene, p- or m-ethylstyrene and 4- or 3-n-propylstyrene.

5. A compound according to claim 1, wherein the peroxide system is an organic peroxide.

6. A compound according to claim 1 further comprising at least one filler.

7. A shaped article comprising a compound according to claim 1.

8. An article according to claim 7 in the form of a medical device or a condenser cap.

9. A medical device comprising an article comprising a compound according to claim 1.

10. A fuel cell comprising an article according to claim 1.

11. A compound comprising
   a. at least one elastomeric polymer comprising repeating units derived from at least one $C_4$ to $C_7$ isomonoolefin monomer, at least one $C_4$ to $C_{14}$ multiolefin monomer, and at least one p- or m-alkylstyrene monomer,
   b. a peroxide curing system, and
   c. at least one filler, and
   wherein the elastomeric polymer does not contain a vinyl aromatic or a polyfunctional monomer cross-linking agent.

12. A compound according to claim 11 wherein the at least one $C_4$ to $C_7$ isomonoolefin monomer is selected from the group consisting of isobutylene, 2-methyl-1-butene, 2-methyl-2-butene and mixtures thereof.

13. A compound according to claim 11 wherein the at least one $C_4$ to $C_{14}$ multiolefin monomer is selected from the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiefle, 2-methyl-1,6-heptadiene, cyclopentadiene, methylcyclopentadiene, cyclohexadiefle and mixtures thereof.

14. A compound according to claim 11 wherein the at least one alkyistyrene monomer is selected from the group consisting of p- or m-methylstyrene, p- or m-ethylstyrene and 4- or 3-n-propylstyrene.

15. A compound according to claim 11, wherein the peroxide system is an organic peroxide.

16. A shaped article comprising a compound according to claim 11.

17. An article according to claim 16 in the form of a medical device or a condenser cap.

18. A medical device comprising an article comprising a compound according to claim 11.

19. A fuel cell comprising an article according to claim 11.

* * * * *